(12) United States Patent
Cherry et al.

(10) Patent No.: US 10,370,044 B2
(45) Date of Patent: Aug. 6, 2019

(54) TIRE CARRIERS FOR VEHICLES AND RELATED METHODS

(71) Applicant: Ford Global Technologies, LLC, Dearborn, MI (US)

(72) Inventors: William Reese Cherry, Madison Heights, MI (US); Matthew B. Rutman, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/721,214

(22) Filed: Sep. 29, 2017

(65) Prior Publication Data

US 2019/0100258 A1 Apr. 4, 2019

(51) Int. Cl.
*B62D 43/02* (2006.01)
*B62D 43/00* (2006.01)
*B66F 3/00* (2006.01)
*B60R 9/06* (2006.01)

(52) U.S. Cl.
CPC ........... *B62D 43/02* (2013.01); *B62D 43/002* (2013.01); *B60R 9/06* (2013.01); *B66F 3/00* (2013.01)

(58) Field of Classification Search
CPC ...... B62D 43/02; B62D 43/002; B62D 43/00; B62D 43/04; B66F 3/00
USPC .......... 224/42.12, 42.21, 42.24, 42.28, 42.29
See application file for complete search history.

(56) References Cited

U.S. PATENT DOCUMENTS

| 3,870,179 | A | * | 3/1975 | Colpitts | ............... | B62D 43/002 |
| | | | | | | 414/466 |
| 4,379,546 | A | * | 4/1983 | McIntosh | .................. | B66F 1/06 |
| | | | | | | 254/111 |
| 4,717,054 | A | | 1/1988 | Vanzant | | |
| 6,659,318 | B2 | | 12/2003 | Newbill | | |
| 8,528,800 | B1 | * | 9/2013 | Newbill | ............... | B62D 43/002 |
| | | | | | | 224/42.21 |
| 8,540,125 | B2 | | 9/2013 | Newbill | | |
| 2002/0040917 | A1 | * | 4/2002 | Newbill | .................... | B60R 9/06 |
| | | | | | | 224/503 |
| 2004/0222261 | A1 | | 11/2004 | Wilson | | |

FOREIGN PATENT DOCUMENTS

| CN | 2902846 | 5/2007 |
| CN | 201895717 | 7/2011 |
| DE | 10311574 | 9/2004 |
| EP | 0426628 | 5/1991 |
| GB | 539624 | 5/1940 |

OTHER PUBLICATIONS

ArmyProperty.com, "Drop-Down Spare Tire Carrier—Mechanical Assist," 2013, retrieved on Aug. 30, 2017, [http://www.armyproperty.com/EquipmentInfo/Accessories/MASTC.htm], 1 page.

* cited by examiner

*Primary Examiner* — Scott T McNurlen
(74) *Attorney, Agent, or Firm* — Vichit Chea; Hanley, Flight & Zimmerman, LLC

(57) ABSTRACT

Tire carriers for vehicles and related methods are disclosed. An example tire carrier includes a hinge to be pivotally coupled to a vehicle. A support arm has a first end to be pivotally coupled to the hinge and a second end to receive a tire. A jack including a beam and running gear. The beam to be pivotally coupled to the hinge and the running gear to be coupled to the second end of the support arm.

23 Claims, 7 Drawing Sheets

US 10,370,044 B2

TIRE CARRIERS FOR VEHICLES AND RELATED METHODS

FIELD OF THE DISCLOSURE

This disclosure relates generally to vehicles and, more particularly, to tire carriers for vehicles and related methods.

BACKGROUND

Motor vehicles typically include a spare tire in the event of a flat or blowout of one of four tires of the vehicle. The spare tires may be carried via the interior or exterior of the motor vehicle. Some vehicles mount a spare tire directly on a rear door or gate of the vehicle via a spare tire carrier.

SUMMARY

An example tire carrier includes a hinge to be pivotally coupled to a vehicle. A support arm has a first end to be pivotally coupled to the hinge and a second end to receive a tire. A jack including a beam and running gear. The beam to be pivotally coupled to the hinge and the running gear to be coupled to the second end of the support arm.

Another example spare tire carrier includes means for supporting a tire and means for attaching the means for supporting the tire to a vehicle. The example tire carrier includes means for actuating removably coupled to the means for supporting and the means for attaching.

A method of coupling a tire carrier to a vehicle includes pivotally coupling a first end of a support arm to a hinge; removably coupling a first end of a jack to the hinge; removably coupling a running gear of the jack to a second end of the support arm opposite the first end; and mounting a tire to the second end of the support arm.

Figure 1:
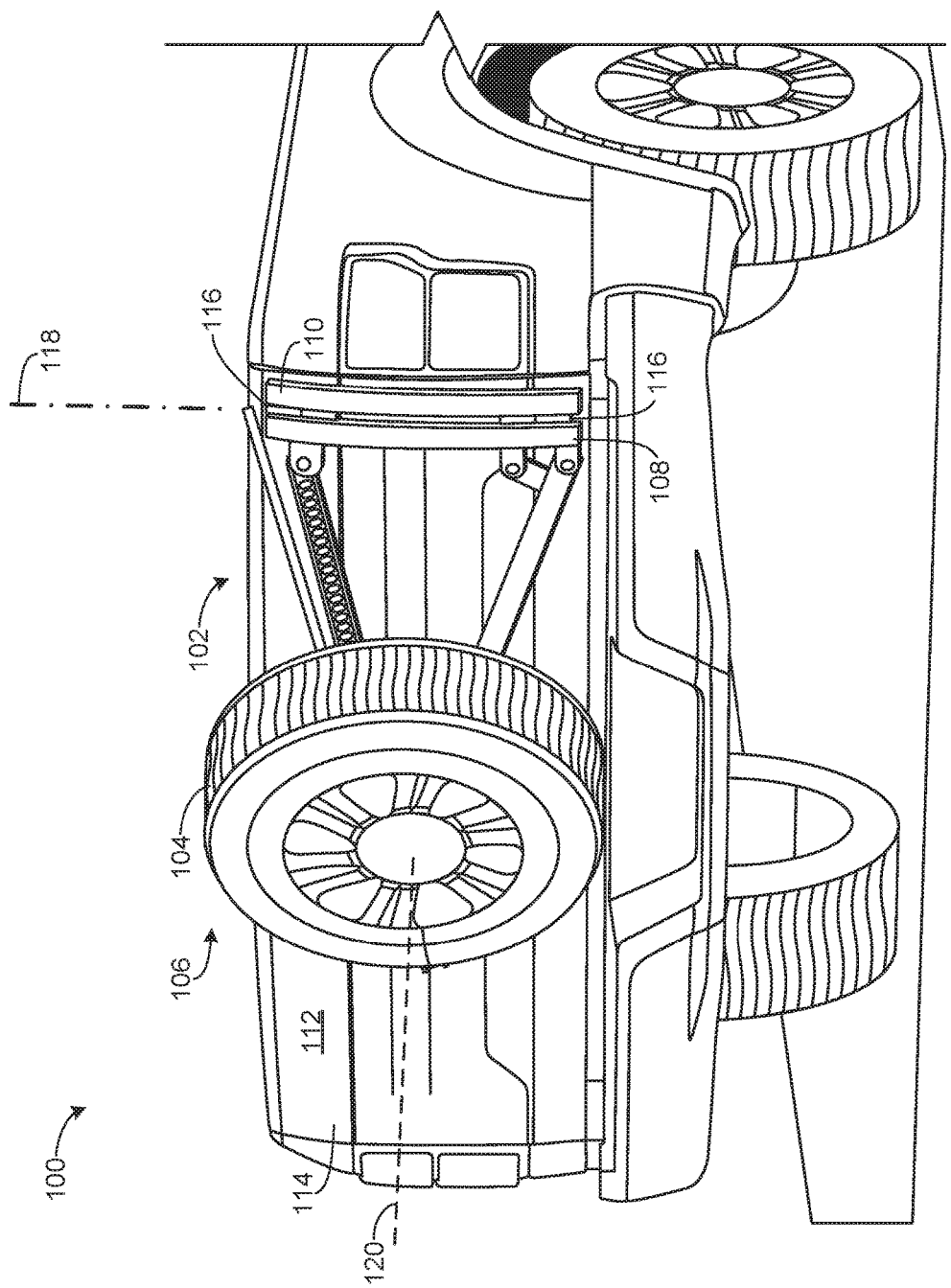
FIG. 1 is a rear, perspective view of an example vehicle that may be implemented with an example spare tire carrier in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are joined directly or through one or more intervening parts. Thus, physical contact is not required for two parts to be coupled or connected.

DETAILED DESCRIPTION

A spare wheel and tire (e.g., hereinafter referred to as a spare tire) of sport utility vehicles are often significantly larger and relatively heavy (e.g., weigh greater than 100 pounds) than spare tires of conventional vehicles (e.g., passenger vehicles). Due to the size and/or weight of the tires, some sport utility vehicles carry a spare tire on a rear door or lift gate of the vehicles. To carry or mount the spare tire to the rear door of a vehicle, sport utility vehicles employ a tire carrier or mounting frame. The increased size and weight of such spare tires can make changing a wheel a difficult task for a single person. In some examples, to move the spare tire relative to the rear door (e.g., to lower the spare tire from the rear door to the ground and/or raise the spare tire from the ground to the rear door), some known tire carriers employ a lift system (e.g., a hydraulic lift systems). However, known spare tire carriers having lift systems are relatively bulky and/or expensive.

Additionally, sport utility vehicles typically require larger size jacks (e.g., farm jacks) to lift the vehicle when changing a tire of the vehicle. Such larger jacks (e.g., having lengths between 4 feet and 5 feet) are difficult to store inside the vehicle. In some examples, these known jacks may be coupled to the spare tire of the vehicle such that a longitudinal axis of the jack is oriented in a substantially vertical orientation, which may be aesthetically unappealing.

Example tire carriers disclosed herein carry a tire on an exterior of a vehicle. Specifically, example tire carriers disclosed herein mount a tire directly to a lift gate or rear door of a vehicle. Additionally, to lift or lower the tire relative to the lift gate or rear door, example tire carriers disclosed herein include a jack. As used herein, a "jack" is a device used to lift heavy objects (e.g., particularly motor vehicles). For example, the example jack disclosed herein may provide a ratcheting mechanism to provide force amplification and directional motion of the tire relative to a rear door of a vehicle. For example, tire carriers disclosed herein employ the jack to move the tire between a first or raised position to store or mount a tire on a lift gate or a rear door of a vehicle and a second or lowered position to move a tire from the lift gate or rear door to be in contact with the ground.

The example jacks disclosed herein are integral with the tire carrier. Thus, the example tire carriers disclosed herein also provide storage for the jack. For example, the example jacks disclosed herein may be carried or mounted directly to the tire carrier when the jack is not in use. Thus, the example spare tire carriers disclosed herein facilitate handling of a spare tire and provide a simple storage solution for a jack (e.g., a farm jack). In some examples, the example jacks disclosed herein may be removably coupled to the example tire carriers. Thus, in some instances, the jack can be removed from the example tire carriers disclosed herein and used to lift a vehicle when, for example, changing a tire of the vehicle.

Thus, example jacks of the example tire carriers disclosed herein may serve a dual purpose. In some examples, the example jacks disclosed herein may be employed to lower and raise the tire supported by an example tire carrier relative to a vehicle. In some examples, the example jacks can be removed from the example tire carrier to lift another object (e.g., a vehicle) at a different location from the tire carrier. In some examples, example jacks disclosed herein are manually actuated jacks. In some examples, example jacks disclosed herein may be mechanical jacks. In some examples, an example jack disclosed herein may be a known jack (e.g., a farm jack) that may be coupled or incorporated with the example tire carrier disclosed herein.

Additionally, the jacks disclosed herein are at least partially positioned between the tire and a surface (e.g., behind the tire) when mounted to the tire carrier. Further, when the example jacks disclosed herein are coupled to the example tire carriers in the stored position, the example jacks disclosed herein are oriented horizontally rather than vertically relative to the vehicle. For example, the example jacks disclosed herein extend more along a width (e.g., a horizontal orientation) of a rear door of a vehicle than along a height (e.g., a vertical orientation) of the vehicle. In this manner, the example jacks disclosed herein are positioned improve an aesthetic appearance of the example tire carriers.

FIG. 1 is an example vehicle 100 implemented with an example tire carrier 102 constructed in accordance with the teachings of this disclosure. The tire carrier 102 of the illustrated example supports and/or stores a tire 104 (e.g., a spare tire, a wheel or rim and a tire) on an exterior of the vehicle 100. The tire carrier 102 of the illustrated example enables movement of the tire 104 between a raised position (e.g., a stored position 106) and a lowered position (e.g., a second position 500 shown in FIG. 5). In the raised position 106, the tire 104 may be spaced from the ground. In the lowered position 500, the tire 104 may be in contact with the ground.

The tire carrier 102 of the illustrated example is shown in the stored position 106. In the stored position 106, the tire carrier 102 of the illustrated example is positioned between the tire 104 and the vehicle 100. Thus, when coupled to the vehicle 100, the tire 104 at least partially covers the tire carrier 102. In this manner, only a portion of the tire carrier 102 may be exposed or unobstructed by the tire 104, thereby improving an aesthetic appearance of the tire carrier 102.

The tire carrier 102 of the illustrated example is pivotally coupled to the vehicle 100. To pivotally couple the tire carrier 102 to the vehicle 100, the tire carrier 102 of the illustrated example includes a hinge 108 and a mounting bracket 110. The mounting bracket 110 couples or mounts (e.g., is fixedly attached) to a frame or structure of the vehicle 100. For example, the mounting bracket 110 mounts to an outer surface 112 of a lift gate or rear door 114 of the vehicle 100. The hinge 108 of the illustrated example is pivotally coupled to the mounting bracket 110 via one or more hinge pins 116. In this manner, the tire carrier 102 and/or the tire 104 can pivot or rotate relative to an axis of rotation 118 (e.g., a vertical axis in the orientation of FIG. 1). For example, the tire carrier 102 of the illustrated example can pivot relative to the rear door 114 of the vehicle 100 between the stored position 106 as shown, for example, in FIG. 1 and a first position 300 as shown, for example, in FIG. 3. In the stored position 106, a longitudinal axis 120 of the tire 104 is substantially perpendicular (e.g., non-parallel) relative to the outer surface 112 of the rear door 114. In the first position 300, the longitudinal axis 120 of the tire 104 is substantially parallel (e.g., non-perpendicular) relative to (e.g., a plane defined by) the outer surface 112 of the rear door 114. Thus, the hinge 108 of the illustrated example pivots relative to the mounting bracket 110 to enable the tire carrier 102 to pivot or swing the tire 104 (e.g., along a horizontal plane) relative to (e.g., toward and away from) the rear door 114 of the vehicle 100 (FIG. 1). In some examples, to retain the tire carrier 102 in the stored position 106, the tire carrier 102, the hinge 108, the mounting bracket 110 and/or the vehicle 100 (e.g., the rear door 114) may include a latch (e.g., spring loaded fingers, a pin, a lock, etc.) to prevent pivotal motion of the tire carrier 102 about the rotational axis 118.

Figure 2:
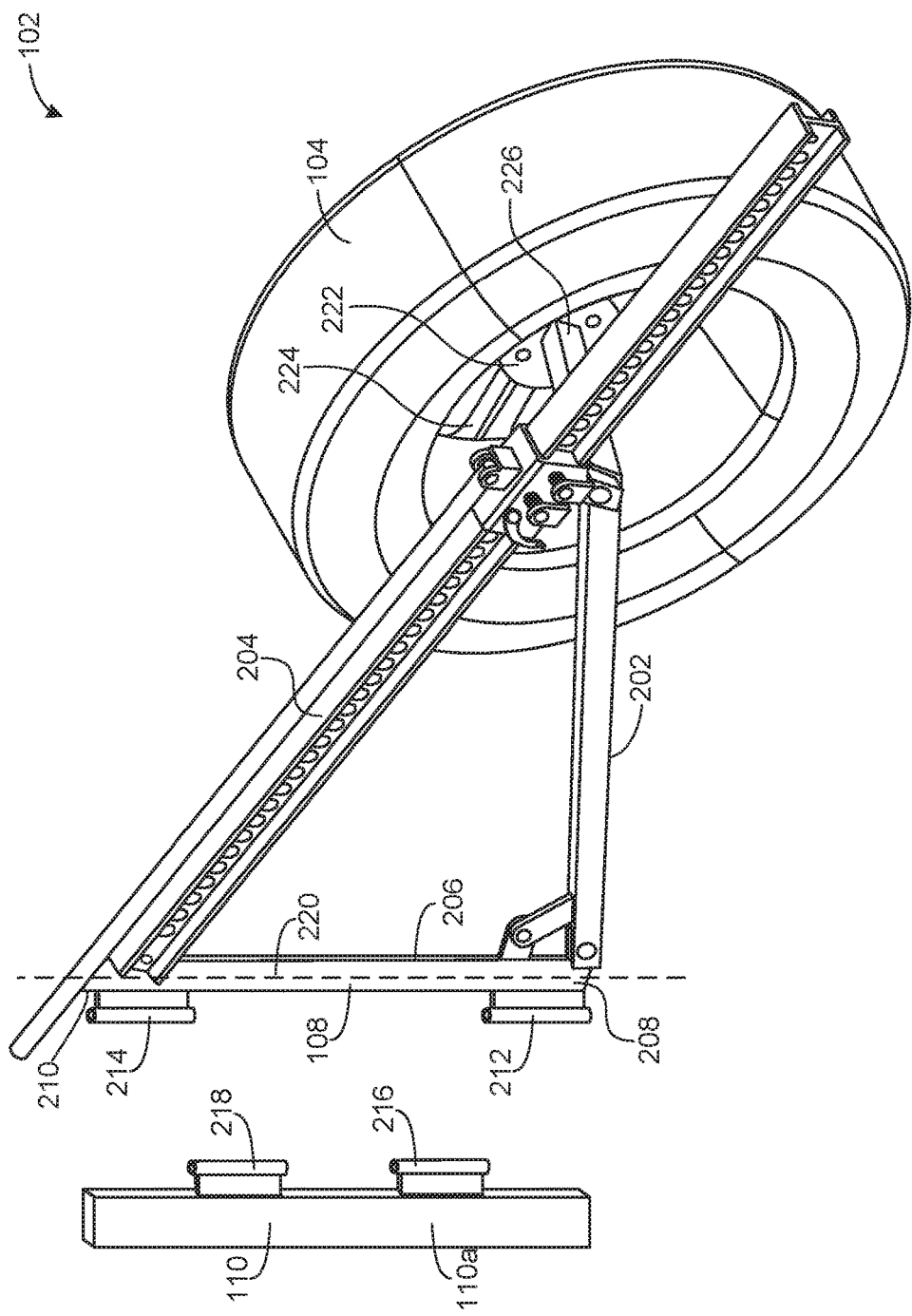
FIG. 2 is a perspective view of the example spare tire carrier of FIG. 1.

FIG. 2 is a perspective view of the example tire carrier 102 of FIG. 1. The tire carrier 102 of the illustrated example includes the hinge 108, a support arm 202 and a jack 204. The hinge 108 of the illustrated example pivotally couples the support arm 202 and the jack 204 to the mounting bracket 110. More specifically, the hinge 108 of the illustrated example includes a hinge body 206 (e.g., an elongate body) having a first end 208 and a second end 210 opposite the first end 208. The hinge body 206 of the illustrated supports a first bearing or knuckle 212 and a second bearing or knuckle 214 spaced from the first knuckle 212. Similarly, the mounting bracket 110 of the illustrated example includes a bracket body 110a (e.g., an elongate body) that supports a first bearing or knuckle 216 and a second bearing or knuckle 218 spaced from the first knuckle 216.

Figure 3:
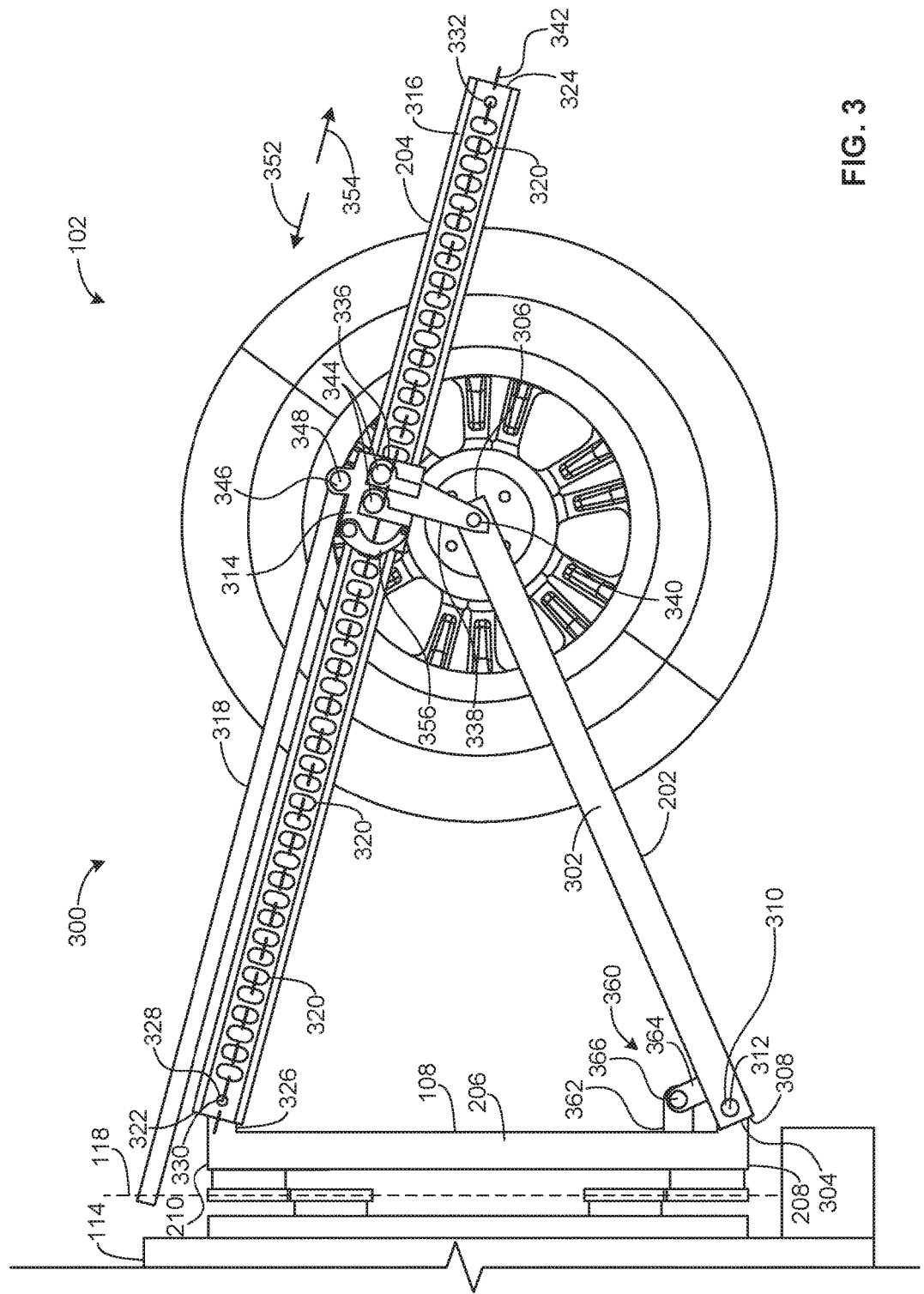
FIG. 3 is a side view of the example spare tire carrier of FIGS. 1-2.

To pivotally couple the hinge 108 and the mounting bracket 110, the first knuckles 212 and 216 of the hinge 108 and the mounting bracket 110 align to receive a first respective one of the hinge pins 116 (FIG. 1) and the second knuckles 214 and 218 of the hinge 108 and the mounting bracket 110 align to receive a second respective one of the hinge pins 116 (FIG. 1). In the illustrated example, the hinge 108 is mounted in a vertical orientation such that a longitudinal axis 220 of the hinge body 206 is substantially parallel to the rotational axis 118 of FIG. 1. Thus, the hinge 108 enables the jack 204 and the support arm 202 to rotate or pivot relative to the mounting bracket 110 when moving the tire 104 from the stored position 106 (e.g. FIG. 1) to the first position 300 (FIG. 3). In some examples, the hinge 108 and/or the mounting bracket 110 provides means for attaching the support arm 202 to the vehicle 100.

The support arm 202 of the illustrated example supports the tire 104. To receive the tire 104, the support arm 202 of the illustrated example includes a hub 222. For example, to secure the tire 104 to the tire carrier 102, the hub 222 of the illustrated example may include fasteners (e.g., lugs) to receive bolt holes of a rim 224 of the tire 104. The hub 222 of the illustrated example is coupled (e.g., welded) to the support arm 202 via a crossbar 226. In some examples, the support arm 202 provides means for supporting the tire 104.

To enable movement (e.g., vertical movement in the orientation of FIG. 2) of the tire 104 relative to the ground and/or the vehicle 100, the tire carrier 102 of the illustrated example employs the jack 204. The jack 204 of the illustrated example is incorporated with the tire carrier 102 to move (e.g., lift or lower) the tire 104 relative to the vehicle 100. In some examples, the jack 204 provides means for actuating to move the tire 104 between the stored position and a lowered position.

The tire carrier 102 of the illustrated example has a triangular shape. For example, the hinge 108, the support arm 202 and the jack 204 are coupled at their respective ends to form a triangular shape or profile. Further, because the jack 204 of the illustrated example is incorporated with the tire carrier 102, the tire carrier 102 provides storage for the jack 204. Additionally, the tire carrier 102 of the illustrated example is positioned between the tire 104 and the rear door 114 of the vehicle 100. Thus, the tire 104 covers (e.g., hides from view) at least a portion of the jack 204 and/or the support arm 202 to improve an aesthetic appeal of the vehicle 100. The jack 204 of the illustrated example is positioned more in a horizontal orientation than a vertical orientation relative to the hinge 108 and/or the vehicle 100. In other words, although the jack 204 of the illustrated example is canted or angled relative to horizontal when coupled to the tire carrier 102, the jack 204 of the illustrated example is positioned or extends a greater distance across the rear door 114 in the horizontal direction than in the vertical direction relative to the rear door 114 when the jack 204 is in the stored position 106, thereby improving an aesthetic of the vehicle 100.

FIG. 3 illustrates the tire carrier 102 of FIGS. 1 and 2 shown in the first position 300. The support arm 202 of the illustrated example includes a body 302 (e.g., a rectangular beam) having a first end 304 and a second end 306 opposite the first end 304. The first end 304 of the support arm 202 of the illustrated example is to be pivotally coupled to the hinge 108. For example, to pivotally couple the support arm 202 and the hinge 108, the first end 304 of the support arm 202 is coupled to a lug 308 protruding from the hinge body 206 via a fastener 310 (e.g., a pin, a bearing, etc.) positioned through respective openings of the lug 308 and the first end 304 of the support arm 202. In some examples, the lug 308 and the fastener 310 form a clevis-pin connection (e.g., a single shear connection, a double shear connection, etc.) and/or any other connection (e.g., quick-release or removable connection or fastener) to enable pivotal motion of the support arm 202 relative to the hinge 108. The support arm 202 pivots relative to the hinge 108 about a first pivot axis 312 (e.g., axis of rotation). The first pivot axis 312 is positioned adjacent the first end 208 of the hinge 108.

The jack 204 of the illustrated example includes a running gear 314 movable along a beam 316 via a handle 318. The beam 316 of the illustrated example includes a plurality of spaced holes 320 between a first end 322 of the beam 316 and a second end 324 of the beam opposite the first end 322. The beam 316 of the illustrated is an I-shaped beam. The first end 322 of the beam 316 of the illustrated example is pivotally coupled to the hinge 108. For example, to pivotally couple the beam 316 and the hinge 108, the first end 322 of the beam 316 is coupled to a lug 326 protruding from the hinge body 206 via a fastener 328 (e.g., a pin, a bearing, etc.) positioned through respective openings of the lug 326 and the first end 322 of the beam 316. In some examples, the lug 326 and the fastener 328 form a clevis-pin connection (e.g., a single shear connection, a double shear connection, etc.) and/or any other connection (e.g., quick-release or removable connection or fastener) to enable pivotal motion of the beam 316 relative to the hinge 108. The beam 316 of the illustrated example is to pivot relative to the hinge 108 about a second pivot axis 330 (e.g., a second axis of rotation) spaced from the first pivot axis 312. For example, the second pivot axis 330 of the illustrated example is positioned adjacent the second end 210 of the hinge 108. The second pivot axis 330 of the illustrated example is parallel relative to the first pivot axis 312. The second end 324 of the beam 316 of the illustrated example includes an opening 332 to receive a jack support base (e.g., a foot).

The running gear 314 of the illustrated example includes a gear body 336 slidably coupled to the beam 316 and pivotally coupled to the second end 306 of the support arm 202. To couple the running gear 314 to the support arm 202, the support arm 202 of the illustrated example includes a foot 338 protruding from the gear body 336 that is coupled to the second end 306 of the support arm 202 via a fastener 340 (e.g., a pin, a bearing, etc.). To move the running gear 314 along a longitudinal axis 342 (e.g., along a length) of the beam 316, the running gear 314 of the illustrated example includes one or more climbing pins 344. The climbing pins 344 are spring loaded pins that move in and out of engagement with respective ones of the spaced holes 320 of the beam 316 when the handle 318 is actuated (e.g., rotated) relative to the beam 316 and/or the running gear 314. For example, the handle 318 of the illustrated example is pivotally coupled to the gear body 336 via a fastener 346 (e.g., a pin, a bearing, etc.). When the handle 318 is rotated or pivoted about a pivot axis 348 defined by the fastener 346, the running gear 314 translates or moves along the longitudinal axis 342 of the beam 316. For example, when the handle 318 pivots relative to the beam 316, a link (not shown) causes the one or more climbing pins 344 to alternate into and out of engagement with the spaced holes 320 and causes the climbing pins 344 to translate along the beam 316, thereby resulting in the running gear 314 moving along the beam 316. Thus, in operation, pivotal movement of the handle 318 relative to the beam 316 is to cause the climbing pins 344 of the running gear 314 to move along the beam 316 via engagement between the climbing pins 344 with respective ones of the spaced holes 320 of the beam 316.

Pivotal movement of the handle 318 causes the running gear 314 to move in a first direction 352 toward the first end 322 of the beam 316 or a second direction 354 toward the second end 324 of the beam 316. To move the running gear 314 in the first direction 352 or the second direction 354 via the handle 318, the running gear 314 of the illustrated example includes a directional lever 356. The directional lever 356 of the illustrated is movable between a first position to cause the running gear 314 to move in the first direction 352 (e.g., toward the first end 322 of the beam 316) and a second position to cause the running gear 314 to move in the second direction 354 (e.g., toward the second end 324 of the beam 316) when the handle 318 is actuated relative to the pivot axis 348.

When the running gear 314 moves in the first direction 352, the support arm 202 pivots toward the second end of the hinge 108 (e.g., an upward direction in the orientation of FIG. 3), and when the running gear 314 moves in the second direction 354, the support arm 202 pivots toward the first end 208 of the hinge 108 (e.g., a downward direction in the orientation of FIG. 3).

The jack 204 of the illustrated example is removably coupled to the tire carrier 102. For example, the jack 204 of the illustrated example is pivotally and removably coupled to the hinge 108 via the fastener 328 and is removably coupled to the support arm 202 via the fastener 340. Upon removal of the fastener 328 and the fastener 340 coupling the beam 316 to the hinge 108 and the support arm 202, the jack 204 may be removed from the tire carrier 102. In other words, the jack 204 of the illustrated example is removable from the tire carrier 102 while the support arm 202 and the tire 104 remain attached to the hinge 108.

To prevent pivotal movement between the support arm 202 (e.g., relative to the hinge 108 when removing the jack 204 from the tire carrier 102), the tire carrier 102 of the illustrated example includes a lock 360. The lock 360 of the illustrated example prevents or restricts pivotal movement of the support arm 202 about the first pivot axis 312 when removing and/or coupling the jack 204 to the tire carrier 102. The lock 360 of the illustrated example is configurable between an unlocked condition to enable rotation of the support arm 202 relative to the hinge 108 and a locked condition to prevent rotation of the support arm 202 relative to the hinge 108.

The lock 360 of the illustrated example includes a first lug 362 protruding from the hinge 108 and a second lug 364 protruding from the support arm 202. A fastener or pin 366 removably couples to the first lug 362 and the second lug 364 via respective openings of the first lug 362 and the second lug 364 to move the lock 360 between the locked condition and the unlocked condition. For example, the pin 366 prevents rotational movement of the support arm 202 relative to the hinge 108 when the pin 366 is inserted into the openings of the first lug 362 and the second lug 364. Removal of the pin 366 from the openings of the first lug 362 and the second lug 364 allows pivotal movement of the support arm 202 relative to the hinge 108. In some examples, the lock 360 provides means for locking pivotal movement of the support arm 202 relative to hinge 108.

In operation, to remove the tire 104 from the tire carrier 102, the tire carrier 102 of the illustrated example is pivoted about the rotational axis 118 of the hinge 108 in a direction away from the rear door 114 from the stored position 106 shown in FIG. 1 to the first position 300 shown in FIG. 3. The lock 360 between the support arm 202 and the hinge 108 is moved to the unlocked condition and the directional lever 356 of the running gear 314 is moved from the first position to the second position to enable the running gear 314 to move in the second direction 354 when the handle 318 is actuated relative to the beam 316.

Figure 4:
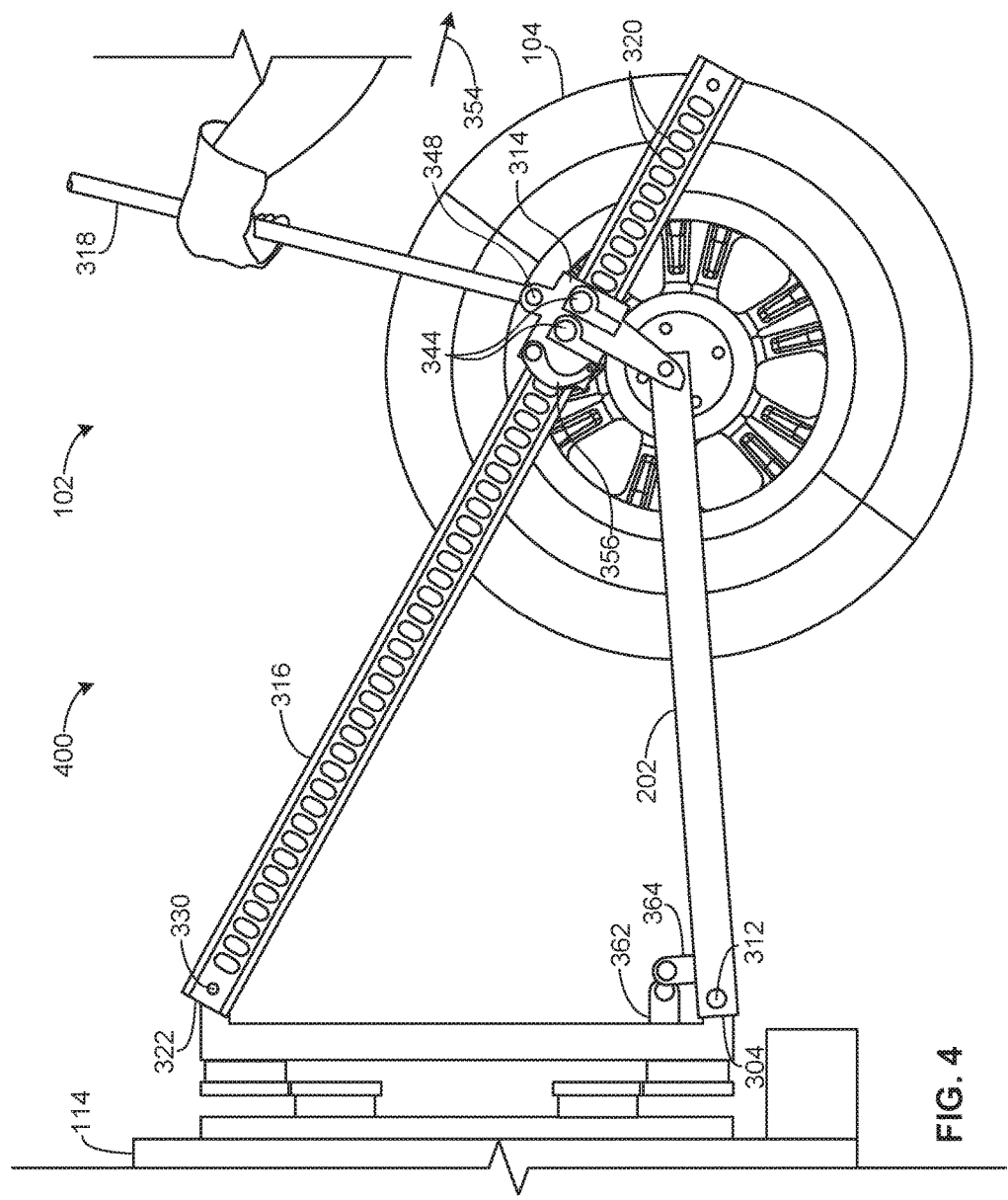
FIG. 4 is a side view of the example spare tire carrier of FIGS. 1-3 shown in an intermediate position.

FIG. 4 is a side view of the example tire carrier 102 of FIG. 1 showing the tire 104 at an intermediate position 400. To move the tire 104 relative to the ground, the handle 318 of the illustrated example is actuated relative to beam 316. For example, a user can manually pivot the handle 318 about the pivot axis 348 to cause the climbing pins 344 of the running gear 314 to move along the length of the beam 316 via the climbing pins 344 engaging the respective ones of the spaced holes 320 of the beam 316. The directional lever 356, when in the second position, causes the running gear 314 to move along the beam 316 in the second direction 354. As the running gear 314 moves in the second direction 354, the pivotal coupling between the second end 306 of the support arm 202 and the running gear 314 causes the support arm 202 to pivot relative to the hinge 108 about the first pivot axis 312 (e.g., in downwardly direction in the orientation of FIG. 4). Likewise, the pivotal coupling between the first end 322 of the beam 316 and the hinge 108 causes the beam 316 to pivot about the second pivot axis 330 (e.g., in downwardly direction in the orientation of FIG. 4). When the pin 366 of the lock 360 is removed (as depicted in FIG. 4), the second lug 364 of the support arm 202 moves away from (e.g., separates from) the first lug 362 of the hinge 108 when lowering the tire 104 toward the ground.

Figure 5:
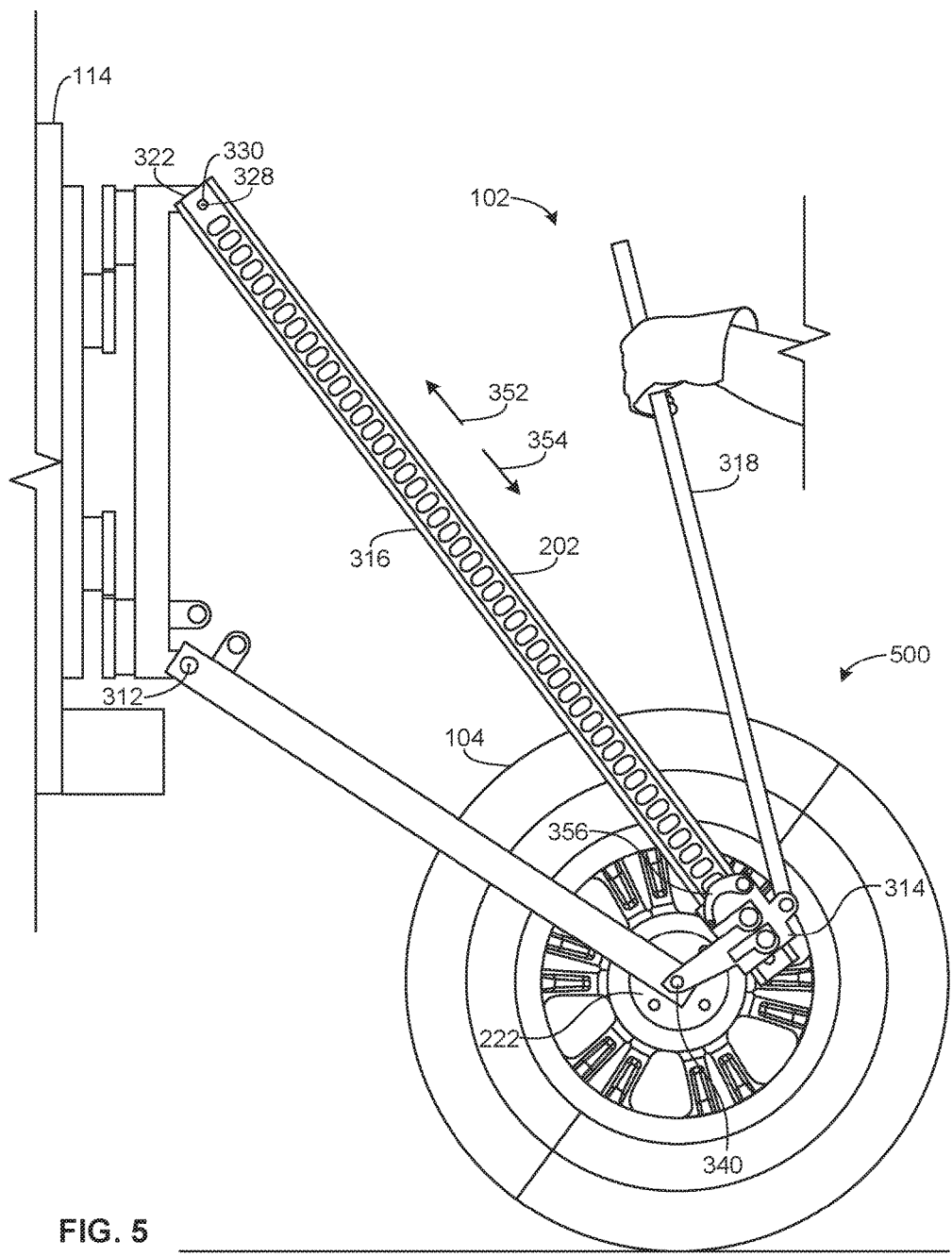
FIG. 5 is a side view of the example spare tire carrier of FIGS. 1-4 shown in a second position.

FIG. 5 is a side view of the example tire carrier 102 of FIGS. 1-4 shown in the second position 500. In the second position 500, the tire carrier 102 of the illustrated example provides the tire 104 on the ground. Thus, the handle 318 of the jack 204 of the illustrated example can be actuated until the tire 104 engages the ground. When the tire 104 engages the ground, the tire 104 can be removed from the hub 222 of the support arm 202. In some examples, the jack 204 of the illustrated example is removed from the tire carrier 102 via removal of the fastener 328 and the fastener 340. With the jack 204 removed from the tire carrier 102, the jack 204 of the illustrated example may be used to lift the vehicle 100 when changing one or more tires of the vehicle 100.

In some examples, prior to removing the jack 204 from the tire carrier 102, the tire carrier 102 may be moved to the first position 300 (e.g., with the tire 104 removed from the tire carrier 102). In some such examples, the directional lever 356 of the jack 204 is moved to the first position to enable the running gear 314 to move in the first direction 352. In some examples, when the tire 104 is removed from the support arm 202, the running gear 314 may slide in the first direction 352 without having to actuating the handle 318 about the pivot axis 348.

To store a tire on the tire carrier 102, a tire (e.g., the tire 104, a tire that is replaced with the tire 104, etc.) is coupled to the support arm 202 via the hub 222 when the tire carrier 102 is in the second position 500. In some examples, prior to coupling the tire to the tire carrier 102, the jack 204 of the illustrated example is coupled or attached to the tire carrier 102 if the jack 204 was previously removed to lift the vehicle 100.

With the jack 204 coupled to the tire carrier 102, the directional lever 356 is moved to the first position and the handle 318 is actuated to move the running gear 314 in the first direction 352. As the running gear 314 moves in the first direction 352 toward the first end 322 of the beam 316, the support arm 202 pivots relative to the first pivot axis 312 and the beam 316 pivots relative to the second pivot axis 330 (e.g., in an upward direction in the orientation of FIG. 5) until the tire carrier 102 and/or the tire 104 is in the first position 300. When the tire carrier 102 and/or the tire is in the first position 300, the lock 360 may be moved to the locked condition to prevent pivotal motion of the support arm 202 relative to the hinge 108. With the tire carrier 102 in the first position 300, the tire carrier 102 may be swung or rotated about the rotational axis 118 toward the rear door 114 of the vehicle 100 until the tire carrier 102 is in the stored position 106. The tire carrier 102 may engage a latch or retainer on the rear door 114 to retain the tire carrier 102 in the stored position 106 during operation of the vehicle 100. In some examples, a fastener (e.g., a pin) may be employed to prevent rotational movement of the hinge 108 relative to the mounting bracket 110. In some examples, a strap (e.g., a hook and loop fastener, a wire, a cable, rope, etc.) may be wrapped around the beam 316 and the handle 318 to retain and/or prevent the handle 318 from moving (e.g., bouncing) relative to the beam 316 when the tire carrier 102 is in the stored position 106 (e.g., and the vehicle is traversing uneven terrain).

Figure 6:
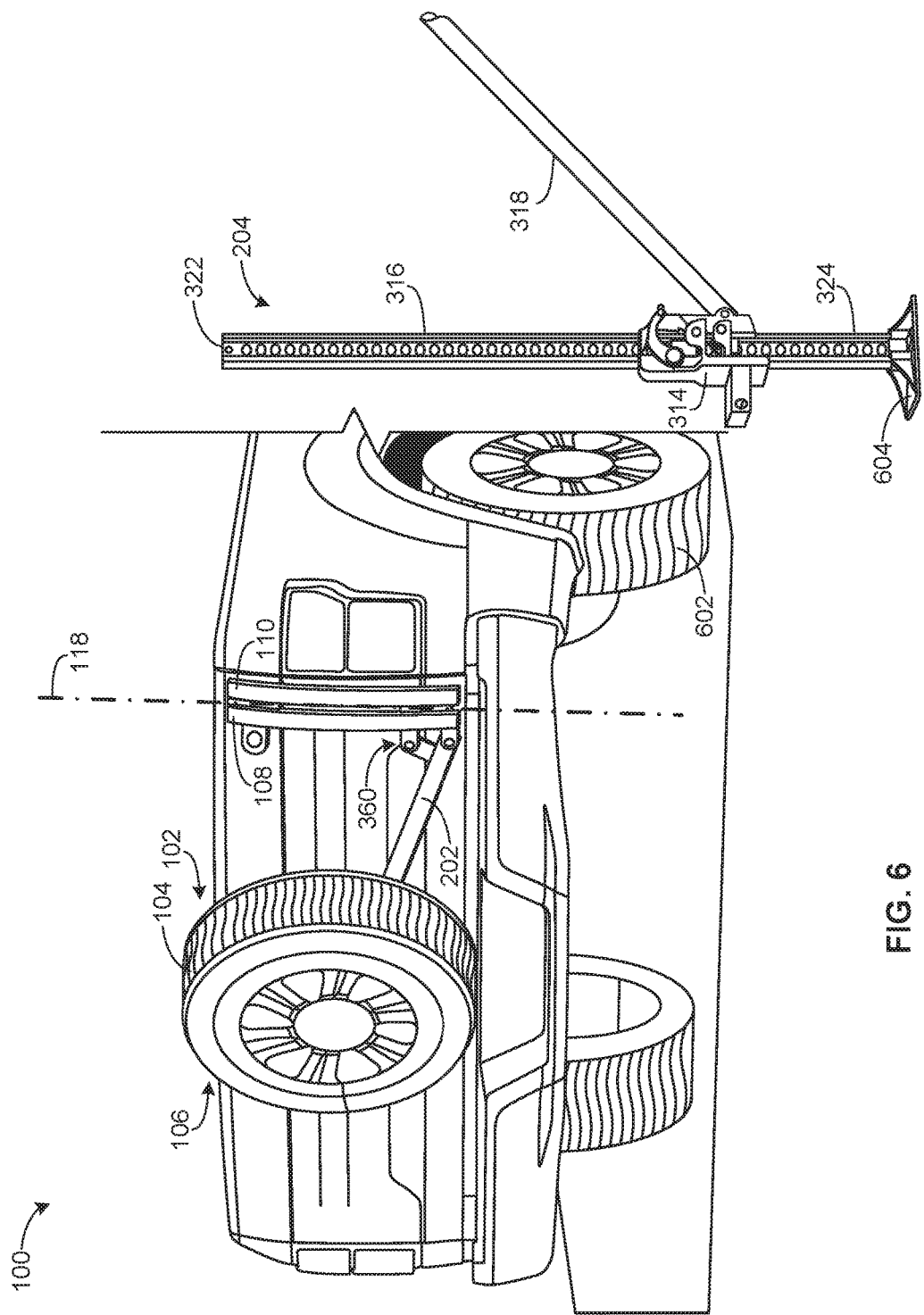
FIG. 6 is a rear, perspective view of the example spare tire carrier of FIGS. 1-3, but showing an example jack of the example tire carrier of FIGS. 1-5 removed from the example tire carrier.

FIG. 6 illustrates the vehicle 100 of FIG. 1 showing the jack 204 removed from the tire carrier 102 while the tire 104 remains coupled to the tire carrier 102 and the tire carrier 102 is in the stored position 106. To remove the jack 204, the tire carrier 102 of the illustrated example is pivoted from the stored position 106 (FIG. 1) to the first position 300 (FIG. 3). The lock 360 is maintained in the locked condition. The fastener 328 (FIG. 3) is removed to decouple the first end 322 of the beam 316 from the hinge 108 and the fastener 340 (FIG. 3) is removed to decouple the running gear 314 from the support arm 202. With the jack 204 removed from carrier 102, the jack 204 of the illustrated example may be used, for example, to lift the vehicle 100 to remove a tire 602 the vehicle 100. In the illustrated example, a base or a foot 604 is coupled or attached to the second end 324 of the beam 316 that provides support to the jack 204 when lifting an object such as, for example, the vehicle 100.

Figure 7:
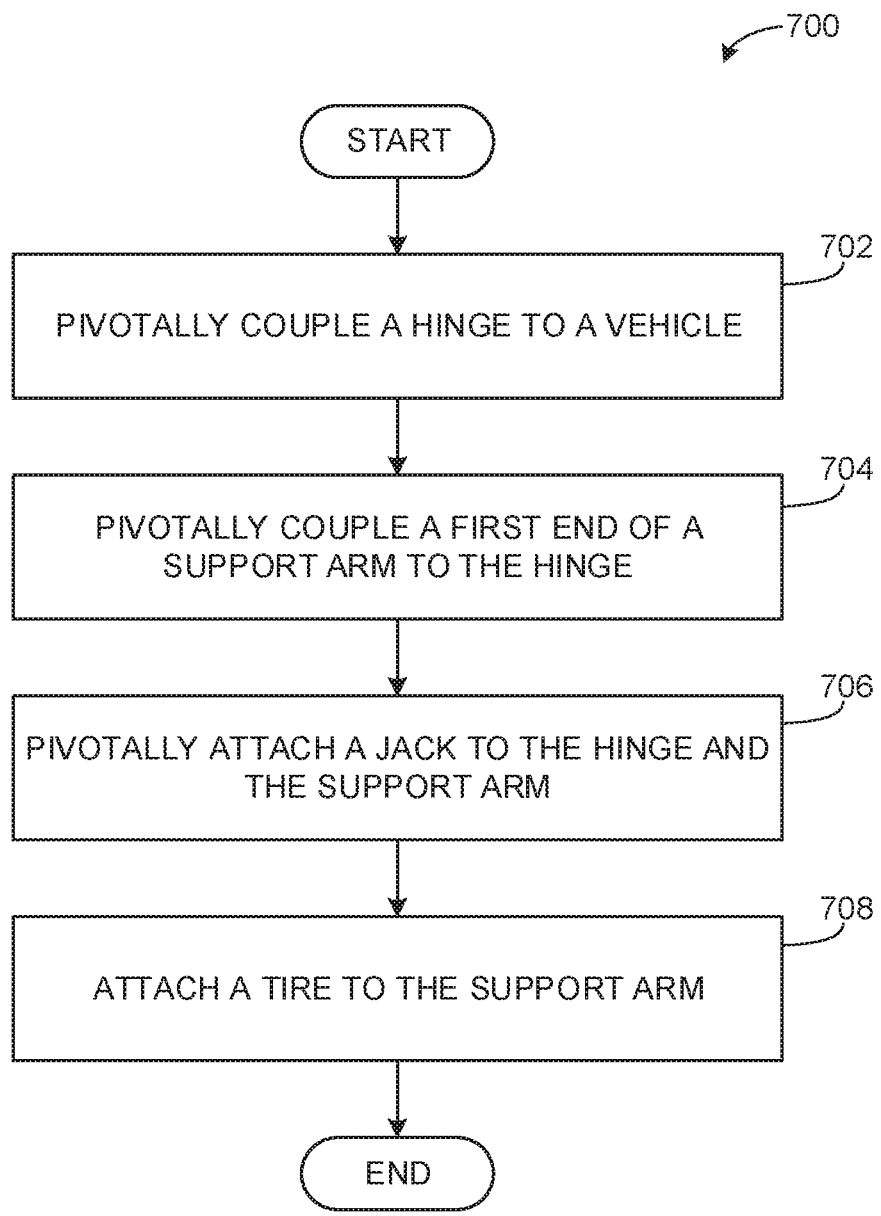
FIG. 7 is a flowchart illustrating a method of assembling an example tire carrier disclosed herein to a vehicle.

FIG. 7 is a flowchart of an example method 700 to assemble an example tire carrier 102 disclosed herein to a vehicle (e.g., the vehicle 100). While an example manner of assembling the example tire carrier 102 has been illustrated in FIG. 7, one or more of the steps and/or processes illustrated in FIG. 7 may be combined, divided, re-arranged, omitted, eliminated and/or implemented in any other way. Further still, the example method 700 of FIG. 7 may include one or more processes and/or steps in addition to, or instead of, those illustrated in FIG. 7, and/or may include more than one of any or all of the illustrated processes and/or steps. Further, although the example method is described with reference to the flowchart illustrated in FIG. 7, many other methods of assembling the tire carrier 102 may alternatively be used.

To begin the example assembly process of FIG. 7, the hinge 108 of the tire carrier 102 is pivotally coupled to the vehicle 100 (block 702). For example, the hinge 108 of the tire carrier 102 is pivotally coupled to the mounting bracket 110. In some examples, prior to pivotally coupling the hinge 108 to the mounting bracket 110, the mounting bracket 110 is attached to the vehicle 100. After the hinge 108 is pivotally coupled to the vehicle 100, the first end 304 of the support arm 202 is pivotally coupled to the hinge 108 (block 704). For example, the first and 304 of the support arm 202 pivotally coupled to the hinge 108 via the fastener 310. In some examples, after the first end 304 of the support arm 202 is pivotally coupled to the hinge 108, pivotal movement between the support arm 202 and the hinge 108 may be prevented by the lock 360. The jack 204 is then attached to the hinge 108 and the support arm 202 (block 706). For example, the first end 322 of the beam 316 is pivotally attached to the hinge 108 via the fastener 328 and the running gear 314 is pivotally attached to the second end 306 of the support arm 202 via the faster 340. The tire 104 is then coupled to the support arm 202 (block 708). For example, the tire 104 may be attached to the support arm 202 via the hub 222.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A tire carrier comprising:
   a hinge to be pivotally coupled to a vehicle;
   a support arm having a first end to be pivotally coupled to the hinge and a second end to receive a tire; and
   a jack including a beam and a running gear, the beam to be pivotally coupled to the hinge and the running gear to be coupled to the second end of the support arm.

2. The tire carrier of claim 1, wherein the beam includes a plurality of spaced holes to receive one or more climbing pins of the running gear to move the running gear along a length of the beam.

3. The tire carrier of claim 2, wherein the running gear includes a directional lever, the directional lever being movable between a first position to cause the running gear to move in a first direction along the length of the beam and a second position to cause the running gear to move in a second direction along the length of the beam opposite the first direction.

4. The tire carrier of claim 2, wherein the running gear is movable between the first end and the second end of the beam via a handle to move the tire between a first position and a second position different than the first position relative to the hinge.

5. The tire carrier of claim 4, wherein the handle is pivotally coupled to the running gear, and wherein pivotal movement of the handle relative to the beam is to cause the climbing pins of the running gear to move along the length of the beam via the one or more climbing pins engaging respective ones of the spaced holes.

6. The tire carrier of claim 1, wherein the jack is removably coupled to the tire carrier.

7. The tire carrier of claim 6, wherein the jack is removable from the tire carrier while the support arm and the tire remain attached to the hinge.

8. The tire carrier of claim 6, wherein a first end of the beam of the jack is to be removably and pivotally coupled to the hinge via a first pin.

9. The tire carrier of claim 8, wherein the running gear of the jack is to be removably and pivotally coupled to the second end of the support arm via a second pin.

10. The tire carrier of claim 1, wherein the beam is to pivot relative to the hinge about a first axis of rotation and the support arm is to pivot relative to the hinge about a second axis of rotation spaced from the first axis of rotation, wherein the first axis of rotation is parallel relative to the second axis of rotation.

11. The tire carrier of claim 10, wherein the first axis of rotation is positioned adjacent a first end of the hinge when the beam is coupled to the hinge and the second axis of rotation is positioned adjacent a second end of the hinge when the support arm is pivotally coupled to the hinge.

12. The tire carrier of claim 1, further including a lock movable between a first position to enable rotation of the support arm relative to the hinge and a second position to prevent rotation of the support arm relative to the hinge.

13. The tire carrier of claim 1, wherein the support arm and the beam are non-telescoping.

14. The tire carrier of claim 1, wherein the support arm and the beam have fixed lengths.

15. The tire carrier of claim 1, wherein the jack is a farm jack.

16. A tire carrier comprising:
    means for supporting a tire;
    means for attaching the means for supporting the tire to a vehicle; and
    means for actuating removably coupled to the means for supporting and the means for attaching, the means for actuating having a fixed length, the means for actuating configured to lift a vehicle when the means for actuating is decoupled from the means for supporting and the means for attaching.

17. The tire carrier of claim 16, wherein the means for actuating is to move between a first position and a second position when coupled to the tire carrier to move the tire between a stored position and a lowered position, the means for actuating being removable from the tire carrier to lift a body of the vehicle.

18. The tire carrier of claim 17, further including means for pivotally coupling the means for supporting and the means for attaching, the means for pivotally coupling to enable the means for supporting to pivot relative to the means for attaching when the means for actuating moves the tire between the stored position and the lowered position.

19. The tire carrier of claim 16, further including means for locking coupled to the means for supporting and the means for attaching, the means for locking movable between a locked position to prevent pivotal movement of the means for supporting relative to means for attaching and an unlock position to allow pivotal movement of the means for supporting relative to the means for attaching.

20. A method of coupling a tire carrier to a vehicle comprising:
    pivotally coupling a first end of a support arm to a hinge;
    removably coupling a first end of a jack to the hinge;

removably coupling a running gear of the jack to a second end of the support arm opposite the first end; and mounting a tire to the second end of the support arm.

21. The method of claim 20, further including attaching the hinge to a body of the vehicle.

22. The method of claim 21, wherein attaching the hinge to the body of the vehicle includes attaching a mounting bracket to the vehicle prior to attaching the support arm and the jack to the hinge.

23. The method of claim 20, wherein removably coupling the first end of the jack to the hinge includes inserting a first pin through an opening of the first end of the jack and an opening of the hinge, and removably coupling the running gear of the jack to the support arm includes inserting a second pin through an opening in a foot of the running gear and an opening in a second end of the support arm.

* * * * *